United States Patent
Persson et al.

(10) Patent No.: US 9,015,825 B2
(45) Date of Patent: Apr. 21, 2015

(54) METHOD AND DEVICE FOR NETWORK COMMUNICATION MANAGEMENT

(71) Applicant: Business Security OL AB, Lund (SE)

(72) Inventors: Lars Persson, Harlosa (SE); Jonas Dellenvall, Sandby (SE); Roger Eriksson, Hjarup (SE)

(73) Assignee: Advenica AB (Publ), Lund (SE)

( * ) Notice: Subject to any disclaimer, the term of this patent is extended or adjusted under 35 U.S.C. 154(b) by 145 days.

(21) Appl. No.: 13/829,890

(22) Filed: Mar. 14, 2013

(65) Prior Publication Data
US 2014/0082719 A1 Mar. 20, 2014

(30) Foreign Application Priority Data
Sep. 19, 2012 (SE) .................................. 1251049

(51) Int. Cl.
*H04L 29/06* (2006.01)
*H04L 12/24* (2006.01)

(52) U.S. Cl.
CPC ........ *H04L 63/0272* (2013.01); *H04L 41/0803* (2013.01); *H04L 41/28* (2013.01); *H04L 63/20* (2013.01)

(58) Field of Classification Search
USPC ......................................................... 726/15
See application file for complete search history.

(56) References Cited

U.S. PATENT DOCUMENTS

| 6,910,067 B1 * | 6/2005 | Sitaraman et al. ............ 709/203 |
| 7,269,639 B1 | 9/2007 | Lawrence |
| 8,379,638 B2 * | 2/2013 | Swartz .......................... 370/389 |
| 8,443,435 B1 * | 5/2013 | Schroeder ...................... 726/15 |
| 8,477,771 B2 * | 7/2013 | Biswas et al. ................. 370/389 |
| 2004/0268148 A1 * | 12/2004 | Karjala et al. ................ 713/201 |

FOREIGN PATENT DOCUMENTS

WO    WO-2010/098914 A1    9/2010

OTHER PUBLICATIONS

"Cisco Group Encrypted Transport VPN", Jan. 10, 2012, XP055112687, Retrieved from the Internet: URL:http://www.cisco.com/c/en/us/td/docs/ios-xml/ios/sec_conn_getypn/configuration/xe-2/sec-get-vpn-xe-2-book/sec-get-vpn.pdf.

(Continued)

*Primary Examiner* — Kambiz Zand
*Assistant Examiner* — Aubrey Wyszynski
(74) *Attorney, Agent, or Firm* — Winstead PC (57) ABSTRACT

Method and device for managing one or more secure gateway virtual private network, VPN, devices (104, 105) in a secure VPN for cryptographically separated and tunnelled VPN communication. VPN configuration data provided by a management system (110) is received (401); and the received VPN configuration data and a domain type encapsulating (402,403), wherein said domain type identifying an administrative network domain for cryptographically separated and tunnelled management communication with a hardware separated administrative controller (121) of said one or more secure gateway VPN devices (104, 105), exclusively for management of said one or more secure gateway VPN devices (104, 105).

21 Claims, 6 Drawing Sheets

(56) References Cited

OTHER PUBLICATIONS

M. Baugher, B. Weis—Cisco; T. Hardjono—Verisign; H. Harney—Sparta: "The Group Domain Interpretation; rfc3547.txt", Jul. 1, 2003, XP015009329, ISSN: 00000003; Sections 1, 4, 5, 6.3.

PCT International Search Report, PCT/SE2013/051099, Apr. 25, 2014.

* cited by examiner

| Header | Domain Type | Data | Digital Signature | Trailer |

| Header | Key ID | Domain Type | Data | Hash | Trailer |

| Header | Key ID | Domain Type | Data | Keyed Hash | Trailer |

METHOD AND DEVICE FOR NETWORK COMMUNICATION MANAGEMENT

TECHNICAL FIELD

The present invention relates generally to the field of virtual private network, VPN, communication management, and more particularly, it relates to a method and device for managing secure gateway virtual private network, VPN, devices in a secure VPN.

BACKGROUND

Two entities communicating in a way not susceptible to eavesdropping or interception is known as secure communication. Secure communication includes means by which people can share information with varying degrees of certainty that third parties cannot intercept. Outsourcing the management of secure communication channels over a network has not been possible because of the risk of leakage and difficulty to remain secure.

The very reason for having secure communication lines is to prevent information leakage. Leakage can occur for many reasons such, but not limited to, inadequate information separation, inferior infra structure policies, failing access restrictions, that leakage cause intellectual property losses, mistrust and monetary losses. Leakage can result in involuntary law infringements, exposure of data that was never meant to be shared, security and business hazards. Leakage might lead to that individuals, groups or even companies and organization could be hurt.

In order to separate information that needs to be protected from leakage that does not need to be protected, a number of actions can be taken. Information that needs to be protected at all stages—during creation, storage, use, transportation and destruction, should be kept as protected as the demands prescribe. Encryption can be a part of the information separation. It is desired to ensure that the infrastructure does not provide back doors, traffic can not be snooped, key gateways or intermediary servers can not be spoofed, data can not be redirected or accessed if it is not intended to be so.

However, the above mentioned actions to be taken are tedious, may be expensive and cumbersome and take a lot of resources, for example extensive hardware and software resources. How far an information owner must go, may be dictated by the directives given for data protection and the consequences for failure to protect this data. When the proper steps are taken, elimination of any possibility of leakage by intentional or unintentional human activities still remains to be taken care of. The leakage may be handled by only giving access to approved personnel, including system and network management.

Only staff that has gone through a certain security clearance can maintain a compound network with components of this security classification. However, this does not prevent the intentional or unintentional human activities indicated. Thus, "secure" networks are not that secure. Virtual Private Networks, VPNs, are not that private and just because data traffic is encrypted over some parts of the network, does not mean that it is encrypted over all parts of the network. Human intervention can be a hard to counter problem.

In one example of a network environment, a company has two offices. The company deals with sensitive information of a certain classification. This information should not be spread since it would hurt the company. However, the two offices need to exchange data in order to fulfil a process flow. There are several ways the company can exchange data, for example by courier; dedicated private lines, such as black fibre; semi open networks, such as MPLS (Multiprotocol label switching); or public networks, such as the Internet. Cryptography may be involved in any of these means. An alternative approach may be a traditional VPN (Virtual Private Network) connection between an office A and an office B, using a non protected carrier net.

Information is in plain text at the office networks (Red Networks) of the office A and the office B, but encrypted in one way or another by means of VPN devices over the transport network (Black Network). The VPN device can be comparatively cheap and cheerful and good enough for a specific task in a rather static environment. Reconfiguration of the VPN devices at the offices A and B may be done with a locally attached console or through a device resident web page accessible from the red net side. It might be possible to log certain events, but on the whole, the device is cumbersome and inflexible and not very manageable. It is definitely unsuitable for anything else than mere point-to-point connections due to the unwieldy management methods for these types of devices.

A communication session according to this configuration may include that data bound from Office A's Red Net to Office B's Red Net is intercepted by the VPN device at Office A's gateway point. The data is encrypted and sent over the Black Network to the corresponding VPN device at Office B. Office B's VPN device decrypts the data and dumps it on Office B's Red Net.

Traffic between Red Net A and Red Net B, traversing the Black Net is protected through cryptographically separated tunnels during the Black Net transfer.

An attacker somewhere on the Black Net could try to intercept packages and decrypt them. The attacker could also try to target the VPN device itself either to break in to it or overloading it. This may lead to that the users may temporarily disconnect the VPN devices on either side of the black net to be able to communicate at all and then intercept unencrypted data streams. Moreover, cheap and cheerful devices also often have a less than outstanding MTBF (Mean Time Between Failure) rating.

In order to make things more manageable, the company might use some sort of administration function. A management software on a computer could be used to manage the proximity VPN device of the Office A and already existing tunnels could be used to manage any remote VPN device on for example the Office B. Key handling, alternatively certificate handling, might be possible to do from the management software on the computer connected to the Office As Red Net.

The entire set-up functions very much like a traditional VPN connection, but since management is centralized, several management functions might be greatly facilitated or even possible to carry out. Depending on the device characteristics and software capabilities, these may include configuration and backup, key- and tunnel handling, incident handling, device performance monitoring/reporting, and management of point-to-multipoint or multipoint to multipoint connection.

Even though a VPN device might be capable of multipoint connections, it is unrealistic to try and set them up without a configuration software and to maintain them without the help of a management system.

Possible attacks might be similar to that of a traditional VPN connection, but since the system is managed in this case, it is now possible to class, identify and localize the attack and based on this information, take appropriate measures.

In order to safely administer the VPN devices, the administrative function needs to have either logical or physical access to the device. Management and remote configurations should always be done from the Red Net network address of the device in order to protect the configuration- and management functions from the Black Net. This means that personnel working with the devices must have clearance to connect to any Red Net that has a VPN device within the area of responsibility for the personnel in question. The organization running Office A and Office B could thus not outsource the management of the VPN devices and tunnels in between them since that would elevate the risk of leakage immensely.

The organization running Office A and Office B and the connection between them would not be able to fully guarantee against leakage when engaging an outsourcing firm even if that outsourcing firm has an impeccable reputation.

Therefore, there is a need for improved communication security preventing eavesdropping or interception when at least two entities are communicating by means of a VPN connection with management and remote configuration of VPN devices.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of the technology to obviate at least some of the above disadvantages and to provide improved management and configuration of virtual private network, VPN, devices in a secure VPN.

As a conceptual idea behind the technology, the present inventor has realized that management and configuration of virtual private network, VPN, devices may be done securely without risk of intervention with regular VPN communication by introducing a novel and beneficial three domain separation. In addition to the two domains of a VPN, i.e the red and black network domains, the present inventor has realized that VPN devices may be provided with a third domain, an administrative domain, which can only be accessed by a central administration function through a dedicated gateway for management and configuration.

This conceptual idea has been reduced into practice at least according to the aspects and embodiments of the technology referred to below.

According to a first aspect of the technology, this is achieved by a method for managing one or more secure gateway virtual private network, VPN, devices in a secure VPN for cryptographically separated and tunnelled VPN communication. The method comprises:

receiving VPN configuration data provided by a management system; and encapsulating the received VPN configuration data and a domain type forming one or more data packets, said domain type identifying an administrative network domain for cryptographically separated and tunnelled management communication with a hardware separated administrative controller of said one or more secure gateway VPN devices, exclusively for management of said one or more secure gateway VPN devices by means of said VPN configuration data.

In some embodiments the method further comprises:

establishing the cryptographically separated and tunnelled management communication with the hardware separated administrative controller of said one or more secure gateway VPN devices; and communicating the data packets including encapsulated VPN configuration data and domain type to the hardware separated administrative controller of said one or more of the secure gateway VPN devices by means of the cryptographically separated and tunnelled management communication over a virtual administrative network defining the administrative network domain for management of the one or more of the secure gateway VPN devices according to the VPN configuration data.

In some embodiments, encapsulating the received VPN configuration data and the domain type comprises: preparing data packets including a data filed with the VPN configuration data, a domain type identifying the administrative network domain, a header filed with a header and a trailer filed with a trailer.

In some embodiments, encapsulating the received VPN configuration data and the domain type further comprises: protecting the integrity of the VPN configuration data and the domain type.

In some embodiments protecting the integrity of the VPN configuration data and the domain type further comprises: generating a digital signature of the data packets using certificates.

In some embodiments protecting the integrity of the VPN configuration data and the domain type further comprises: calculating a hash value of the VPN configuration data and the domain type; and encrypting the domain type, the VPN configuration data, and the hash value filed by using a secret key.

In some embodiments the method further comprises preparing data packets including a Key ID field indicating to the receiving secure gateway VPN device which key to be used for decryption.

In some embodiments protecting the integrity of the VPN configuration data and the domain type further comprises: calculating a keyed hash value of the VPN configuration data and the domain type; and encrypting the VPN configuration data and the domain type by using a secret key.

According to a second aspect of the technology, this is achieved by a method of managing secure gateway virtual private network, VPN, devices in a secure VPN for cryptographically separated and tunnelled VPN communication, the method comprising:

receiving data packets comprising encapsulated VPN configuration data and a domain type, said domain type identifying an administrative network domain for cryptographically separated and tunnelled management communication with a hardware separated administrative controller of said one or more secure gateway VPN devices, exclusively for management of one or more secure gateway VPN devices;

extracting the VPN configuration data and the domain type from the data packets;

identifying the domain type;

if the domain type is identified to be the administrative network domain, configuring the one or more secure gateway VPN devices according to the received VPN configuration data.

A third aspect of the technology is an administration gateway for managing one or more secure gateway virtual private network, VPN, devices in a secure VPN for cryptographically separated and tunnelled VPN communication. The administration gateway comprises:

a first communication interface adapted to receive VPN configuration data provided by a management system; and an administrative gateway controller operatively connected to the first communication interface and a second communication interface, wherein the administrative gateway controller is adapted to:

encapsulate the received VPN configuration data and a domain type, said domain type identifying an administrative network domain for cryptographically separated and tunnelled management communication with a hardware separated administrative controller of said one or more secure gateway VPN devices, exclusively for management of said one or more secure gateway VPN devices by means of the VPN configuration data.

In some embodiments the administrative gateway controller is operatively connected to a second communication interface and is further adapted to establish the cryptographically separated and tunnelled communication with the hardware separated administrative controller of said one or more secure gateway VPN devices;
and
the second communication interface is adapted to communicate the encapsulated VPN configuration data and domain type to the hardware separated administrative controller of said one or more of the secure gateway VPN devices by means of the cryptographically separated and tunnelled management communication over a virtual administrative network defining the administrative network domain exclusively for management of the one or more of the secure gateway VPN devices according to the VPN configuration data.

A fourth aspect of the technology is a secure gateway virtual private network, VPN, device for cryptographically separated and tunnelled VPN communication comprising:
a first communication interface adapted to receive data packets comprising encapsulated VPN configuration data and a domain type, said domain type identifying an administrative network domain for cryptographically separated and tunnelled management communication, via the cryptographically separated and tunnelled management communication separate from said cryptographically separated and tunnelled VPN communication, exclusively for management of the secure gateway VPN device by means of the VPN configuration data;
a hardware separated administrative controller operatively connected to the first communication interface (120) and adapted to:
identify only the administrative network domain and to only extract configuration data from data packets of the administrative network domain; and
configure the secure gateway VPN device according to the received VPN configuration data, if the domain type is an administrative network domain.

In some embodiments of the secure gateway virtual private network, VPN, device it comprises a plain text side controller operatively connected to the first communication interface and adapted to only identify plain text data packets of a red domain received by the first communication interface and forward the data packets to a red network via a red communication interface of the secure gateway VPN device, wherein data packets of any other domain type than the red domain are blocked.

An advantage of some embodiments of the technology is that management access by a central administration to secure gateway VPN devices in a secure VPN are provided while any attempts by the central administration to extract data from data packets communicated within a red or black domain in the secure VPN are prevented,

BRIEF DESCRIPTION OF THE DRAWINGS

Further objects, features and advantages of the invention will appear from the following detailed description of embodiments of the invention, with reference being made to the accompanying drawings, in which.

DETAILED DESCRIPTION

Embodiments of the invention will be described with reference to FIGS. 1-4, which all illustrate schematically an example arrangement according to some embodiments of the invention. The same reference signs are used for corresponding features in different figures.

Figure 1:
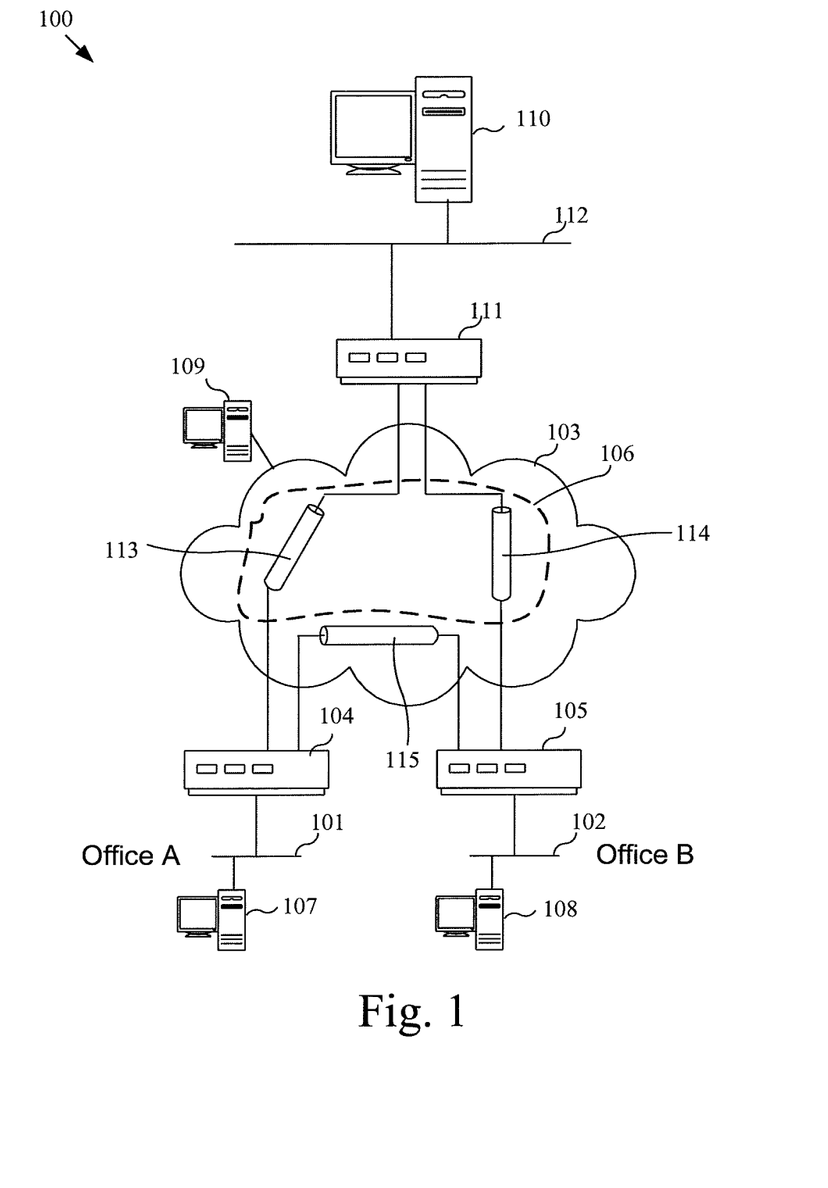
FIG. 1 illustrates an example network topology of a secure VPN (Virtual Private Network) according to one aspect of the present technology.

FIG. 1 illustrates an example network topology of a secure VPN (Virtual Private Network) 100 according to one aspect of the present technology, using the Internet or another intermediate network to connect computers to isolated remote computer networks that would otherwise be inaccessible. The VPN provides security so that traffic sent through the VPN connection stays isolated from other computers on the intermediate network.

The secure VPN may be configured with a mixture of equipment and/or network nodes at several locations.

With reference now to FIG. 1, two LANs (red networks 101,102) in an office A 101 and an office B 102 are connected to the Internet (black network) 103, or another intermediate network, through secure gateway VPN devices 104, 105, respectively. Since each secure gateway VPN device 104, 105 has a red side and a black side, and is configured for cryptographically separated and tunnelled VPN communication, it insures that unauthorized traffic outside the LAN, i.e traffic on the transportation black network 103, on the black side cannot come inside any of the secure red networks 101,102 on the red side.

In addition, the secure gateway VPN devices 104, 105 also have a third side for connection and communicating with a virtual administrative network 106.

Data from the red networks 101,102 can not enter the black network 103 without being encrypted and red network devices 107, 108 on the red networks 101, 102 can not access the black network 103 through the secure gateway VPN devices 104, 105. And reversely, the only data that may arrive from the black network 103 to the secure gateway VPN devices 104,105 and that can traverse the secure gateway VPN devices to the red networks 101,102 is such data that is correctly encrypted with valid keys and methods. One or more network devices 109 may be connected directly or via other networks to the black network 103. However, no black network devices 109 connected to the black network 103 can access any red network devices 107, 108 on any of the red networks 101, 102. The network devices 109 connected to the black network 103 can only deliver data up to the secure gateway VPN devices. Two domains, i.e a red domain and a black domain, are separated. The red (first) domain may be defined by one or more red networks and the black (second) domain may be defined by one or more black networks. According to some embodiments of the technology, the red domain may be defined by the red networks 101 and 102, and the black domain may be defined by the black network 103.

The secure gateway VPN device(s) 104, 105 provide a third domain, the administrative domain or administrative network domain. By means of this third domain, the secure gateway VPN device(s) 104, 105 is configured not to be accessed for configuration- and management actions from neither the red network(s) 101, 102 nor the black network 103. The secure gateway VPN devices 104, 105 are configured for cryptographic separation of the virtual administrative network from the black network as well as from the red networks.

The virtual administrative network 106 can only be reached from a central administration function of a management system 110 through an administration gateway device (AGW) 111. The virtual administrative network 106 is delimited to connections between the AGW 111 and separated hardware functions within the secure gateway VPN devices 104, 105. The management system 110 may be operated by an administrator responsible for device configuration and device management/supervision. The management system 110 is connected to a central administrative network 112 forming an administrative operation centre providing the central administration and configuration function. The AGW 111 is configured to operate as a router between the central administration of the central administrative network 112 and the virtual administrative network 106. The AGW 111 can connect to the secure gateway VPN devices 104, 105 over the black network 103 but it only gets access to the virtual administrative network 106 by means of one or more cryptographically separated administrative operation tunnels 113, 114 for cryptographically separated and tunnelled management communication between the central administration and hardware separated functionality within the VPN devices 104, 105.

Both the central administrative network 112 and the virtual administrative network 106 are part of the third domain, i.e the administrative domain, but these two administrative networks are still functionally separated networks. The central administrative network may be configured for exchanging information between different functions within the central administration. On the other hand, the administrative network is configured for transmission of operations initiated by the central administration at the central administrative network 112 to be performed on the secure gateway VPN devices 104, 105 via the cryptographically separated tunnels 113, 114 over the black network 103.

The cryptographically separated administrative operation tunnels 113, 114 are completely separated from a cryptographically separated data exchange tunnel 115, which is configured for data exchange between the red networks 101 and 102, i.e regular cryptographically separated and tunnelled VPN communication. However, the cryptographically separated administrative operation tunnels 113, 114 as well as the one or more cryptographically separated data exchange tunnels 115 may use the same transport network.

The AGW 111 may be a specially adapted VPN device configured to encrypt outbound traffic. Thus, one or more of, but not limited to, maintenance functions, configuration services, log functions, performance data gathering, key handling functions, firmware upgrades, SLA (Service Level Agreement) founding measurements and polls etc may take place within the third domain without access to neither of the red networks 101, 102 nor the black network 103. The three domain separation is implemented in hardware, i.e in hardware configuration of the secure gateway VPN devices 104, 105 and the AGW 111. The administrative network 106,112 is not aware of any other means of connectivity except through a cryptographically separated tunnel to the AGW 111 for the central administrative function managed by the management system 110. The third domain, i.e the administrative domain 106, is a cryptographically separated domain utilizing the same transport network, for example but not limited to the black network (for example the Internet) 103, as is used for information exchange between the plain text sides 101 and 102 on the VPN network. The transport network 103 may be an unprotected network or a protected network. In each case VPN-tunnels may be established within the unprotected or the protected network and do not allow any other access in or out of the device than management access.

With reference to FIG. 1, the two red networks 101 and 102 are able to exchange information through a cryptographically separated tunnel 115 over the black network 103. The central administrative network 112 "housing" the central administration and configuration functions preformed by the management system 110, is a variant of a red network, since it may communicate over the black network 103 to deployed secure gateway VPN devices 104, 105. However, the administration function executed by the management system 110 uses a specially adapted device, i.e the AGW 111 that communicates to a virtual remote administrative network to which the managed secure gateway VPN devices 104, 105 are attached. The virtual administrative network 106 is completely unable to communicate with the red networks and the black network. It can not be configured in any way to communicate with the red net or the black net. The virtual remote administrative network 106 may only provide communication between the management system 110 over to the central administrative network 112 and through the AGW 111 within the third domain in order to provide various management and configuration functions of the secure gateway VPN devices 104, 105. Hence, the AGW 111 and the secure gateway VPN devices 104, 105 are configured to provide a cryptographically separated and tunnelled communication for management and configuration of the secure gateway VPN devices 104, 105.

For higher security requirements the secure gateway VPN device(s) 104, 105 may have at least two interfaces, one RED communication interface carrying plain text data, and one BLACK communication interface carrying encrypted data. The administrator may reach the device for configuration through another encrypted channel. This means that this encrypted channel ends up inside the secure gateway VPN device(s) 104, 105. The encrypted channel can be on a separate (third) communication interface or using the RED or BLACK interface. If the RED or BLACK interface is used, there must be a separation that distinguishes management traffic from other data. This mechanism is implemented through credentials. Only a specific credential allows management access and prevents access to the red networks, as will be described in further detail below. A credential may be a marking inside a certificate, or based on user/identity.

Figure 1A:
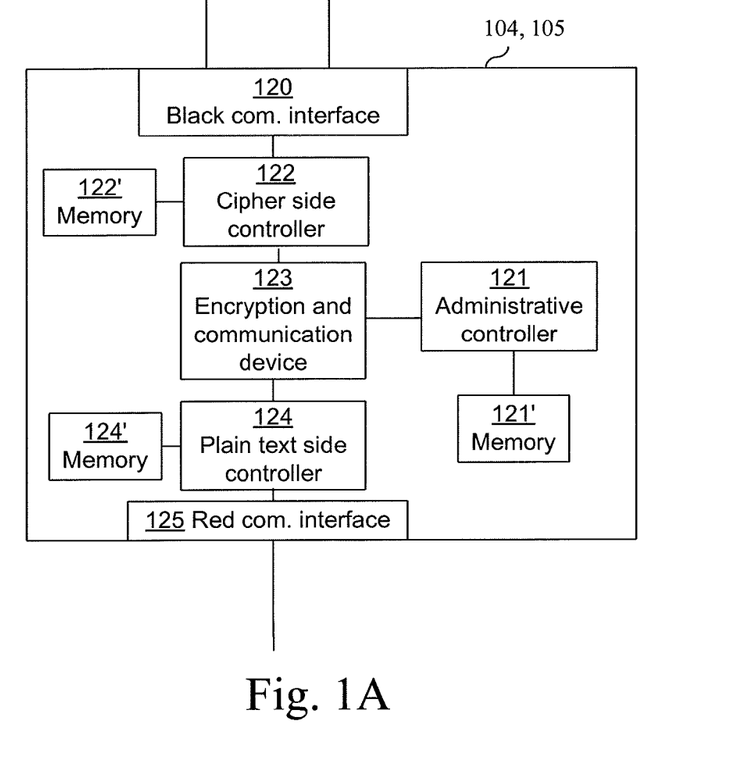
FIG. 1A is a block diagram of a secure gateway VPN device according to some embodiments of the technology.

FIG. 1A is a block diagram of an embodiment of the secure gateway VPN device 104 or 105. A Black communication interface 120 of the secure gateway VPN device 104 is adapted to receive data packets from the black network 103.

In this embodiment, the black communication interface 120 has, but is not limited to, two inputs/outputs. One, two or a plurality of inputs/outputs may be connected to the same black communication interface 120. The received data packets may have been transmitted over the administrative network 106 either by the cryptographically separated administrative operation tunnel 113 from the central administration 112 and hardware separated functionality within the VPN device 104 or by the cryptographically separated data exchange tunnel 115 for data exchange between the red networks 101 and 102.

Data packets transmitted by the cryptographically separated administrative operation tunnel 113 may comprise encapsulated VPN configuration/management data and a domain type, wherein the domain type identifies the administrative network domain for cryptographically separated and tunnelled management communication, exclusively for management and/or configuration of the secure gateway VPN device 104, 105. An administrative controller 121 and a computer memory 121' of the secure gateway VPN device 104, 105 is operatively connected to the Black communication interface 120 via a cipher side controller 122 and an encryption and communication device 123. The administrative controller 121 is adapted to extract and identify whether the domain type is the administrative domain, extract the VPN configuration data from the received data packets; and configure/manage the secure gateway VPN device 104,105 according to the received VPN configuration/management data, if the domain type is determined to be an administrative network domain. The administrative controller 121 is configured to only identify the administrative network domain and to only extract data from data packets of the administrative network domain. The administrative controller 121 is unable to identify any of the red or black domain types. Thereby, this specific credential allows management access to the secure gateway VPN device 104,105 and prevents any and all attempts to extract data from data packets communicated within the red or black domain, i.e prevents all possible access attempts, intentional and unintentional, by the central administration to the red networks.

Hence, the administrative controller 121 may be configured to operate in response to functions initiated by the central administration. The functions may including, but are not limited to, maintenance functions, configuration services, log functions, performance data gathering, key handling functions, firmware upgrades, SLA (Service Level Agreement) founding measurements and polls etc, which may involve information exchange between the administrative controller 121 of the secure gateway VPN device, 104, 105 and the management system 110.

The cipher side controller 122 and a computer memory 122' of the secure gateway VPN device 104, 105 is operatively connected to the Black communication interface 120. The cipher side controller 122 is configured to verify the digital signature(s) and/or fetch the secret key(s) from the memory 122' to be used for verification and/or decryption of the data packets according to a particular communication protocol by the encryption and communication device 123 of the secure gateway VPN device 104. The encryption and communication device 123 is adapted to decrypt data of the received data packets into plain text data packets. A plain text side controller 124, which is operatively connected to the encryption and communication device 123, is adapted to only identify plain text data packets of the red domain and forward the packets to the red network 101 via a red communication interface 125 of the secure gateway VPN device 104. Plain text packets of the administrative domain are identified by the administrative controller 121 as described above. The administrative controller 121 is hardware separated from the cipher side controller 122 as well as the plain text side controller 124 and the administrative controller is not able to directly communicate with any of the two other controllers 122 and 124 of the secure gateway VPN device 104.

Thereby, all possible access attempts by the central administration to the red networks are prevented by blocking data packets of any other domain type, particularly data packets of the administrative network domain. In this embodiment, the red communication interface 125 has, but is not limited to, one input/output. One, two or a plurality of inputs/outputs may be connected to the same red communication interface 125.

The red communication interface 125 may further be configured to receive plain text data packets from the red network 101 to be encrypted for further transmission on the black network 103. The plain text side controller 124 and a computer memory 124' may be configured to select the digital signature(s) and/or secret key(s) from the computer memory 124' to be used for encapsulating the plain text data packets. The encryption and communication device 123 is adapted to sign and/or encrypt the data packets into ciphered data packets according to the particular communication protocol and forward the data packets to the black network 103. The signed and/or ciphered data packets is forwarded via the black communication interface 120 for transmission to the other red network 102 by the cryptographically separated data exchange tunnel 115.

Figure 1B:
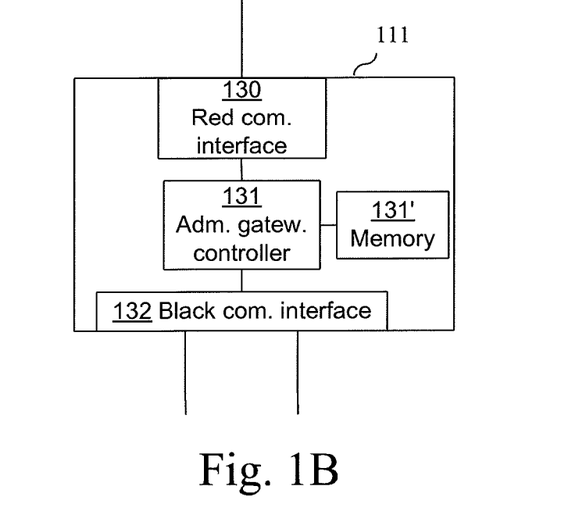
FIG. 1B is a block diagram of an administration gateway VPN device according to some embodiments of the technology.

FIG. 1B is a block diagram of the AGW 111. The AGW 111 may comprise a red communications interface 130 with one or a plurality of input/outputs adapted to receive VPN configuration data provided by the management system 110. An administrative gateway controller 131 and a computer memory 131' is operatively connected to the red communication interface 130 and a black communication interface 132 with one or a plurality of inputs/outputs, wherein the controller 131 is adapted to encapsulate the received VPN configuration data and a domain type according to a particular communication protocol, wherein the domain type identifies the administrative network domain for cryptographically separated and tunnelled management communication, exclusively for management of said one or more secure gateway VPN devices 104, 105. The black communication interface is adapted to communicate the encapsulated VPN configuration data and domain type to one or more of the secure gateway VPN devices 104, 105 by means of the cryptographically separated and tunnelled management communication 113, 114 over the virtual administrative network 106 which defines the administrative network domain for management and configuration of the one or more of the secure gateway VPN devices 104, 105 according to the VPN configuration data.

Figure 2A:
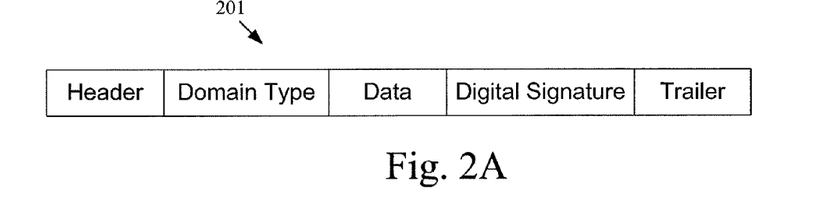
FIG. 2A shows a data packet of a communication protocol according to an embodiment of the present technology.
Figure 2B:
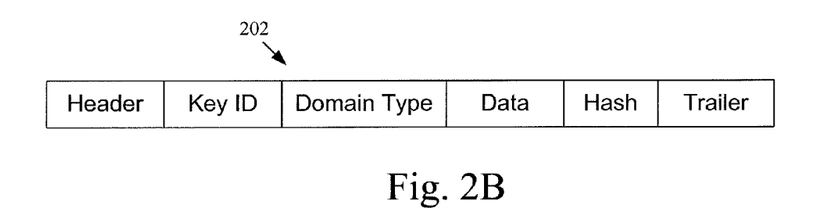
FIG. 2B shows a data packet of a communication protocol according to an embodiment of the present technology.
Figure 2C:
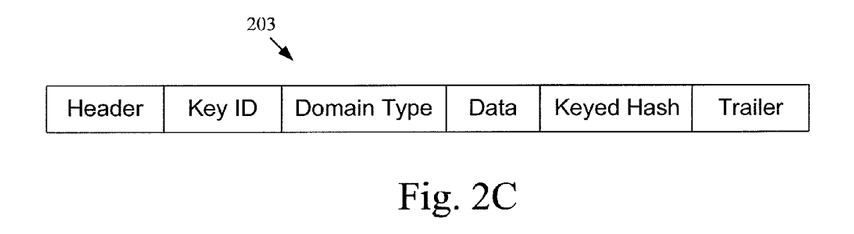
FIG. 2C shows a data packet of a communication protocol according to an embodiment of the present technology.

The main functionality of a VPN device is to encapsulate data through encryption/digital signing and send that data to another VPN device that de-encapsulates the data. FIG. 2 illustrates the encapsulation of data through encryption in a particular communication protocol according to some embodiments of the present technology. A message according to the communication protocol may include, but is not limited to, a data filed for data to be transmitted, a domain type filed for identifying the allowable domain, i.e a first, second or third domain, of the current message, a header filed and a trailer filed. Moreover, the domain type and the data fields of the messages need to be protected against manipulation, but may also be protected against eavesdropping.

With reference to the embodiment shown in FIG. 2A, the integrity of the domain type field and the data filed of a data packet 201 may be protected by a digital signature using certificates. The data packet 201 of the communication protocol may include, but is not limited to, a data filed for data to be transmitted, a domain type filed for identifying the allowable domain, i.e a first, second or third domain, of the current message, a header, for example, but not limited, to and TCP/IP or UDP header, filed and a trailer filed.

With reference to the embodiment shown in FIG. 2B, the integrity of the domain type field and the data field of a data packet 202 may be protected by calculating a hash value of these fields and then encrypting the domain type, data, and hash field by using a secret key. The Key ID may indicate to the receiving secure gateway device which key to be used for decryption.

With reference to the embodiment shown in FIG. 2C, the integrity of the domain type field and the data field of a data packet 203 may be protected by calculating a keyed hash value of these fields and then encrypting the domain type field and the data field by using a secret key. In this embodiment, the keyed hash may not need to be encrypted. The Key ID may indicate to the receiving device which key to be used for decryption.

Figure 3:
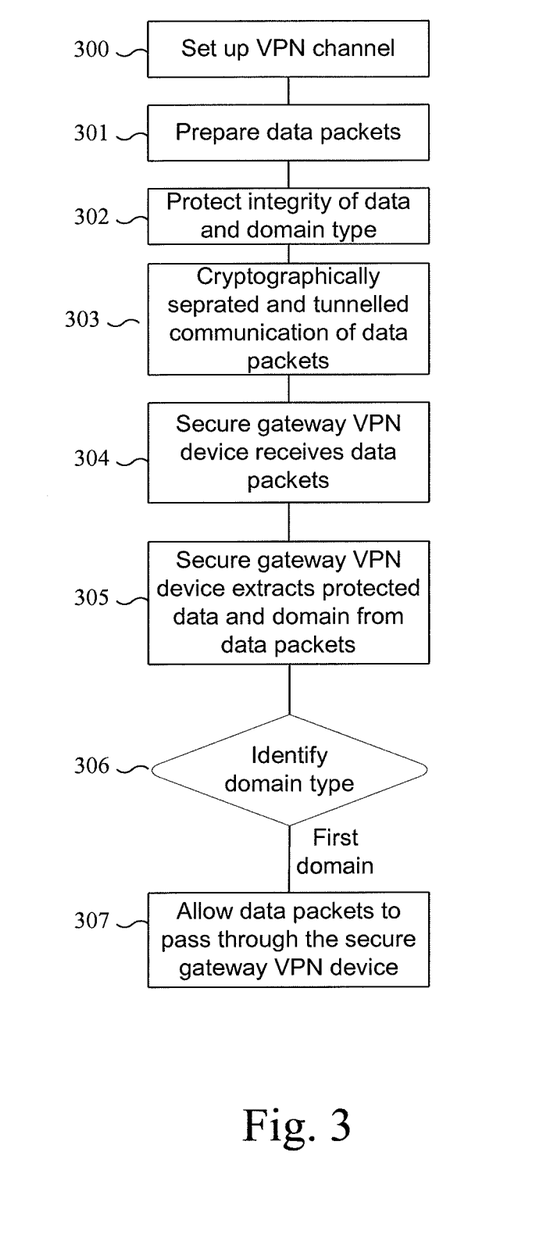
FIG. 3 is a flowchart of a method for the setup and communication in a VPN according to an embodiment of the present technology.

According to an embodiment of a method of the present technology, the secure gateway VPN devices 104 and 105 may establishes a cryptographically separated and tunnelled VPN communication over the black network 103 for exchanging data between the red network device 107 of the first red network 101 and the red network device 108 of the second red network 102. With reference to FIG. 3, a secure data VPN channel is set up 300 for exchanging data between the red network device 107 of the first red network 101 and the red network device 108 of the second red network 102. Data is communicated from the red network device 107 as data packets. The secure gateway VPN device 104 of the first red network 101 prepares 301 data packets including, but not limited to, a data filed for data to be transmitted from the red network device 107, the domain type filed for identifying the allowable domain, i.e the first domain, of the current message, a header filed and a trailer. The integrity of the domain type filed and the data field are protected 302 by encapsulating the data according to, but not limited to, any of the embodiments described in connection with FIGS. 2A-C above. The data packet is communicated 303 by means of cryptographically separated and tunnelled VPN communication from the secure gateway VPN device 104 over the black network 103. The secure gateway VPN device 105 of the second red network 101 receives the data packet 304 and extracts 305 the encapsulated data and domain type from the data, by verifying the digital signature(s) and/or fetch the secret key(s) from the memory 122' to be used for verification and/or decryption of the data packets according to any of, but not limited to, the particular communication protocols as described in connection with FIGS. 2A-C, by the encryption and communication device 123 of the secure gateway VPN device 104. If the domain type is identified 306 to be of the first domain, i.e the red domain, data is allowed to pass through 307 the secure gateway VPN device 105 for transmission to the receiving red network device 108 of the second red network 102. Data packets of any other domain type, particularly data packets of the third domain type, i.e administrative network domain, are blocked. Thereby, all possible access attempts by the central administration to the red networks are prevented.

Figure 4:
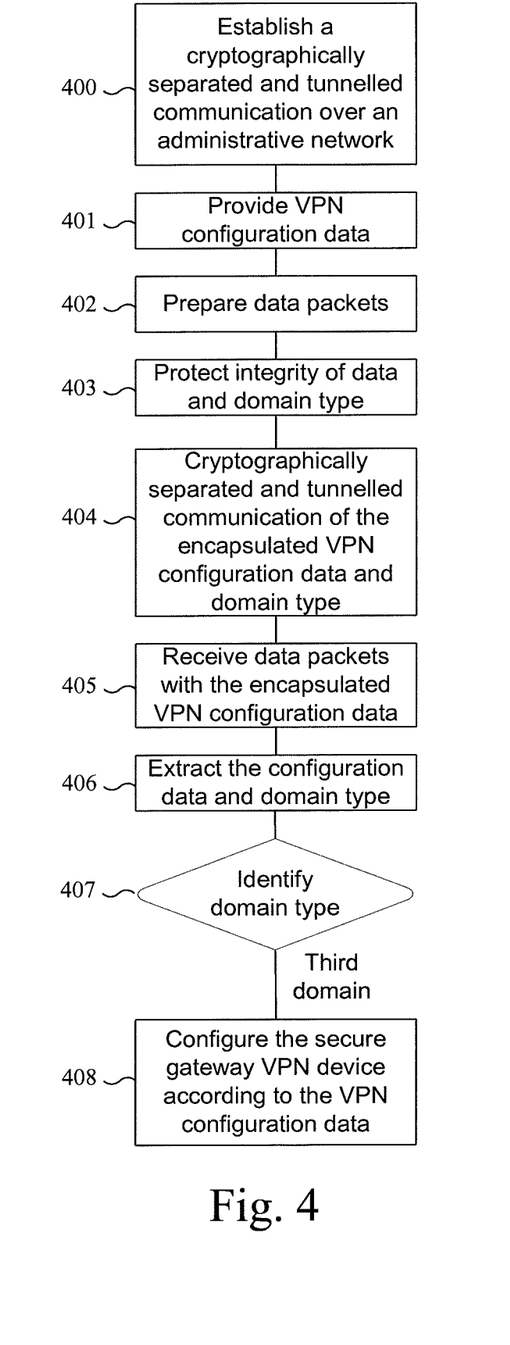
FIG. 4 is a flowchart of a method for managing one or more secure gateway virtual private network, VPN, devices in a secure VPN according to some embodiments of the present technology.

FIG. 4 is a flow chart illustrating management and configuration of one or more of the secure VPN devices 104, 105 in a secure VPN, according to an aspect of the present technology. The AGW 111 and the secure gateway VPN devices 104, 105 may establish 400 cryptographically separated and tunnelled management communication over the virtual remote administrative network 106, which is separate from any existing or future established cryptographically separated and tunnelled VPN communication involving any of the secure gateway VPN devices 104, 105. The management and configuration system 110 provide VPN configuration data 401. The AGW 111 prepares 402 data packets including, but not limited to, a data filed for data to be transmitted, the domain type filed for identifying the allowable domain, i.e the third domain of the current data packets, a header filed and a trailer. The integrity of the domain type filed and the data field are protected by encapsulating the data according to, but not limited to, any of the embodiments described in connection with FIGS. 2 A-C above.

Then, the VPN configuration data is communicated 404 to the secure gateway VPN device 104 by means of the cryptographically separated and tunnelled management communication over the virtual remote administrative network 106, i.e separated from any other cryptographically tunnelled communication over the black network 103 for exchanging data between the red network device 107 of the first red network 101 and the red network device 108 of the second red network 102.

Establishing 400 the cryptographically separated and tunnelled management communication over the virtual remote administrative network has been described to take place separately herein. However, establishing the cryptographically separated and tunnelled management communication may be part of or including or take place after one or more of providing VPN configuration data, preparing data packets, and protecting the integrity of the configuration data and domain type, The secure gateway VPN device 104 receives 405 the data packets with the encapsulated VPN configuration data. The secure gateway VPN device 104 of the first red network 101 extracts 406 the configuration data and domain type from the received data packets, by verifying the digital signature(s) and/or fetch the secret key(s) from the memory 122' to be used for verification and/or decryption of the data packets according to any of, but not limited to, the particular communication protocols as described in connection with FIGS. 2A-C, by the encryption and communication device 123 of the secure gateway VPN device 104. Then, the domain type is identified 407. If the domain type is the third domain, i.e the administrative domain, data is not allowed to pass through the secure gateway VPN device 104. Instead, the secure gateway VPN device 104 keeps the data within the secure gateway VPN device 104, and configures 408 the VPN device according to the received VPN configuration data.

The three domain separation prevents unauthorized users/persons from accessing classified information communicated between red network devices. Leakage through human activities, intentional or unintentional, are reduced, because only users authorized to handle classified information are actually able to do so. Personnel responsible for configuring and maintaining the compound VPN system itself including the secure gateway VPN devices are unable to participate or intercept in any red network communication but only accessing the third domain for management and configuration matters. Maintenance and configuration of a VPN system may be outsourced to a third party that does not have the clearance to take part of the data and information on the red networks on the VPN system.

Telecommunications operators, ISPs (internet service provider), outsourcing companies and others may provide VPN as a service to any customer and guarantee that the customer information is safe guarded even when it comes to the service provider itself.

According to some embodiments of the technology, the security may be provided as a service, enabling users to adjust their security level over time. The security option is available from no security up to really high security levels without changing the rest of their infrastructure.

Each one of the secure gateway VPN devices 104, 105 and the administration gateway device 111 may be embodied as a digital electronic computer or computer apparatus and processes performed in a computer apparatus or system. The computer apparatus may comprises a data processing system, including a computer processor for processing data, and storage means connected to the computer processor for storing data on a storage medium.

Each one of the secure gateway VPN 104, 105 and the AGW 111 may be embodied as an electronic computational device with tamper protection, i.e involve prevention of access to the electronic circuitry of the device, any information comprised in the electronic circuitry (such as program code or configurations of the circuitry), or any internal signals generated by the electronic circuitry. Additionally or alternatively, tamper protection of the electronic encryption device may involve that attempts to access the electronic circuitry, information, or signals are detected.

The technology has been described herein with reference to various embodiments. However, a person skilled in the art would recognize numerous variations to the described embodiments that would still fall within the scope of the technology. For example, it should be noted that in the description of embodiments of the technology, the partition of functional blocks into particular units is by no means limiting to the invention. Contrarily, these partitions are merely examples. Functional blocks described herein as one unit may be split into two or more units. In the same manner, functional blocks that are described herein as being implemented as two or more units may be implemented as a single unit without departing from the scope of the invention.

The present technology may be embodied as a method in a device, device, or system with a computer program product. Accordingly, the present technology may take the form of an entirely hardware embodiment, or an embodiment combining software and hardware aspects all generally referred to herein as a device. Furthermore, the software of the present technology may take the form of a computer program product. The computer program product may be stored on a computer-usable storage medium having computer-usable program code embodied in the medium. The embodiments of the invention described with reference to the drawings comprise a computer apparatus and processes performed in the computer apparatus. The program may be in the form of source code, object code a code suitable for use in the implementation of the method according to the invention. The carrier can be any entity or device capable of carrying the program. For example the carrier may be a record medium, computer memory, read-only memory, computer-readable medium or an electrical carrier signal. Embodiments according to the technology may be carried out when the computer program product is loaded and run in a system or device having computer capabilities, i.e the secure gateway VPN device and the administration gateway.

Figure 5:
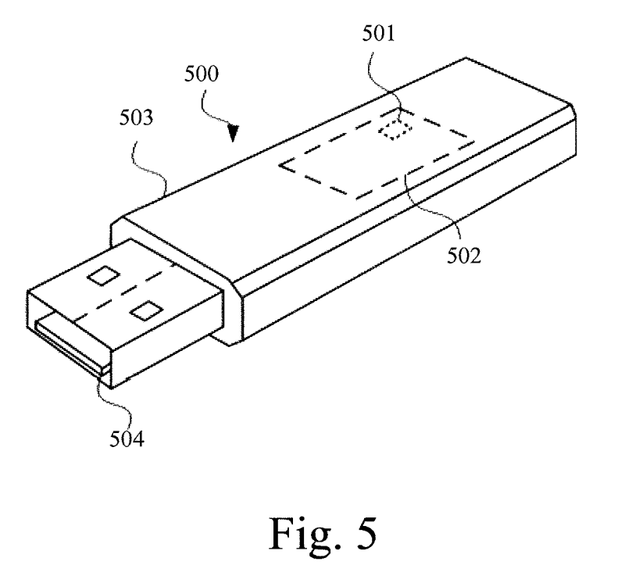
FIG. 5 shows a schematic view of a computer-readable medium implementing the method of the present technology.

FIG. 5 shows a schematic view of a computer-readable medium as described above. The computer-readable medium 500 is in this embodiment a memory stick, such as a Universal Serial Bus (USB) stick. The USB stick 500 comprises a housing 503 having an interface, such as a connector 504, and a memory chip 502. The memory chip 502 is a flash memory, that is, a non-volatile data storage that can be electrically erased and re-programmed. The memory chip 502 is programmed with instructions 501 that when loaded (possibly via the interface 504) into a controller such as a processor executes a method or procedure according to the embodiments disclosed above. The USB stick is arranged to be connected to and read by a reading device, such as the secure gateway VPN devices 104 and 105 or the AGW 111, for loading the instructions into the controller. It should be noted that a computer-readable medium can also be other mediums such as compact discs, digital video discs, hard drives or other memory technologies commonly used. The instructions can also be downloaded from the computer-readable medium via a wireless interface to be loaded into the controller.

Embodiments of the present invention have been described herein with reference to flowchart and/or block diagrams. It will be understood that some or all of the illustrated blocks may be implemented by computer program instructions. These computer program instructions may be provided to a processor of a general purpose computer, special purpose computer, or other programmable data processing apparatus to produce a machine, such that the instructions when executed create means for implementing the functions/acts specified in the flowchart otherwise described.

It is to be understood that the functions/acts noted in the flowchart may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

A computer program product may comprise computer program code portions for executing the method, as described in the description and the claims, for providing control data when the computer program code portions are run by an electronic device having computer capabilities, i.e the secure gateway VPN device and/or the administration gateway.

A computer readable medium having stored thereon a computer program product may comprise computer program code portions for executing the method, as described in the description and the claims, for providing control data when the computer program code portions are run by an electronic device having computer capabilities, i.e the secure gateway VPN device and the administration gateway.

The many features and advantages of the invention are apparent from the detailed specification, and thus, it is intended by the appended claims to cover all such features and advantages of the invention, which fall within the scope of the technology. However, although embodiments of the method and apparatus of the technology has been illustrated in the accompanying drawings and described in the foregoing detailed description, the disclosure is illustrative only and changes, modifications and substitutions may be made without departing from the scope of the technology as set forth and defined by the following claims. Hence, it should be understood that the limitations of the described embodiments are merely for illustrative purpose and by no means limiting. Instead, the scope of the technology is defined by the appended claims rather than by the description, and all variations that fall within the range of the claims are intended to be embraced therein.

The invention claimed is:

1. A method for managing one or more secure gateway virtual private network, VPN, devices in a secure VPN for cryptographically separated and tunnelled VPN communication, the method comprising:
   receiving VPN configuration data provided by a management system; and
   encapsulating the received VPN configuration data and a domain type forming one or more data packets, said domain type identifying an administrative network domain for cryptographically separated and tunnelled management communication with a hardware separated administrative controller of said one or more secure gateway VPN devices, exclusively for management of said one or more secure gateway VPN devices by means of said VPN configuration data.

2. The method of claim 1, further comprising:
   establishing the cryptographically separated and tunnelled management communication with the hardware separated administrative controller of said one or more secure gateway VPN devices; and
   communicating the data packets including the encapsulated VPN configuration data and domain type to the hardware separated administrative controller of said one or more of the secure gateway VPN devices by means of the cryptographically separated and tunnelled management communication over a virtual administrative network defining the administrative network domain for management of the one or more of the secure gateway VPN devices according to the VPN configuration data.

3. The method of claim 1, wherein encapsulating the received VPN configuration data and the domain type comprises: preparing data packets including a data filed with the VPN configuration data, a domain type identifying the administrative network domain, a header filed with a header and a trailer filed with a trailer.

4. The method of claim 1, wherein encapsulating the received VPN configuration data and the domain type further comprises: protecting an integrity of the VPN configuration data and the domain type.

5. The method of claim 4, wherein protecting the integrity of the VPN configuration data and the domain type further comprises: generating a digital signature of the data packets using certificates.

6. The method of claim 4, wherein protecting the integrity of the VPN configuration data and the domain type further comprises:
   calculating a hash value of the VPN configuration data and the domain type; and
   encrypting the domain type, the VPN configuration data, and the hash value filed by using a secret key.

7. The method of claim 6, further comprising: preparing data packets including a Key ID field indicating to the receiving secure gateway VPN device which key to be used for decryption.

8. The method of claim 4, wherein protecting the integrity of the VPN configuration data and the domain type further comprises:
   calculating a keyed hash value of the VPN configuration data and the domain type; and
   encrypting the VPN configuration data and the domain type by using a secret key.

9. A computer-program product comprising a non-transitory computer-usable medium having computer-readable program code embodied therein, the computer-readable program code adapted to be executed to implement a method comprising:
   receiving VPN configuration data provided by a management system; and
   encapsulating the received VPN configuration data and a domain type forming one or more data packets, said domain type identifying an administrative network domain for cryptographically separated and tunnelled management communication with a hardware separated administrative controller of said one or more secure gateway VPN devices, exclusively for management of said one or more secure gateway VPN devices by means of said VPN configuration data.

10. A method for managing secure gateway virtual private network, VPN, devices in a secure VPN for cryptographically separated and tunnelled VPN communication, the method comprising:
    receiving data packets comprising encapsulated VPN configuration data and a domain type, said domain type identifying an administrative network domain for cryptographically separated and tunnelled management communication with a hardware separated administrative controller of said one or more secure gateway VPN devices, exclusively for management of one or more secure gateway VPN devices;
    extracting the VPN configuration data and the domain type from the data packets;
    identifying the domain type; and
    if the domain type is identified to be the administrative network domain, configuring the one or more secure gateway VPN devices according to the received VPN configuration data.

11. An administration gateway device for managing one or more secure gateway virtual private network, VPN, devices in a secure VPN for cryptographically separated and tunnelled VPN communication, the administration gateway comprising:
    a first communication interface adapted to receive VPN configuration data provided by a management system; and
    an administrative gateway controller operatively connected to the first communication interface and a second communication interface, wherein the administrative gateway controller is adapted to:
    encapsulate the received VPN configuration data and a domain type, said domain type identifying an administrative network domain for cryptographically separated and tunnelled management communication with a hardware separated administrative controller of said one or more secure gateway VPN devices, exclusively for management of said one or more secure gateway VPN devices by means of the VPN configuration data.

12. The administration gateway device of claim 11, wherein the administrative gateway controller is operatively connected to a second communication interface and is further adapted to establish the cryptographically separated and tunnelled management communication with the hardware separated administrative controller of said one or more secure gateway VPN devices; and
    the second communication interface is adapted to communicate the encapsulated VPN configuration data and domain type to the hardware separated administrative controller of said one or more of the secure gateway VPN devices by means of the cryptographically separated and tunnelled management communication over a virtual administrative network defining the administrative network domain exclusively for management of the one or more of the secure gateway VPN devices according to the VPN configuration data.

13. A secure gateway virtual private network, VPN, device for cryptographically separated and tunnelled VPN communication comprising:
- a first communication interface adapted to receive data packets comprising encapsulated VPN configuration data and a domain type, said domain type identifying an administrative network domain for cryptographically separated and tunnelled management communication, via the cryptographically separated and tunnelled management communication separate from said cryptographically separated and tunnelled VPN communication, exclusively for management of the secure gateway VPN device by means of the VPN configuration data;
- a hardware separated administrative controller operatively connected to the first communication interface and adapted to:
- identify only the administrative network domain and to only extract configuration data from data packets of the administrative network domain; and
- configure the secure gateway VPN device according to the received VPN configuration data, if the domain type is an administrative network domain.

14. The secure gateway virtual private network, VPN, device according to claim 13, comprising a plain text side controller operatively connected to the first communication interface and adapted to only identify plain text data packets of a red domain received by the first communication interface and forward the data packets to a red network via a red communication interface of the secure gateway VPN device, wherein data packets of any other domain type than the red domain are blocked.

15. The secure gateway virtual private network, VPN, device according to claim 13, wherein the encapsulated VPN configuration data and the domain type forming data packets including a data filed with the VPN configuration data, a domain type identifying the administrative network domain, a header filed with a header and a trailer filed with a trailer.

16. The secure gateway virtual private network, VPN, device according to claim 13, wherein the received VPN configuration data and the domain type forming data packets protecting an integrity of the VPN configuration data and the domain type.

17. The secure gateway virtual private network, VPN, device according to claim 13, wherein an integrity of the VPN configuration data and the domain type is protected by a digital signature of the data packets using certificates.

18. The secure gateway virtual private network, VPN, device according to claim 13, wherein an integrity of the VPN configuration data and the domain type is protected by a hash value calculated of the VPN configuration data and the domain type; and wherein the domain type, the VPN configuration data, and the hash value filed are encrypted by means of a secret key and forming part of the data packets.

19. The secure gateway virtual private network, VPN, device according to claim 18, wherein the data packets comprises a Key ID field indicating to the receiving secure gateway VPN device which key to be used for decryption.

20. The secure gateway virtual private network, VPN, device according to claim 13, wherein an integrity of the VPN configuration data and the domain type is protected by a keyed hash value of the VPN configuration data and the domain type; and the PN configuration data and the domain type are encrypted by means of a secret key.

21. The computer-program product according to claim 9, wherein said computer-usable medium is a record medium, computer memory, or read-only memory.

* * * * *